United States Patent [19]

Garza-Tamez

[11] Patent Number: 5,152,110
[45] Date of Patent: Oct. 6, 1992

[54] DAMPING SYSTEM FOR STRUCTURE STABILIZATION SYSTEM

[76] Inventor: Federico Garza-Tamez, Rio Tamesi 305 Col. Mex., Monterrey, N.L., Mexico

[21] Appl. No.: 708,917

[22] Filed: Jun. 3, 1991

[51] Int. Cl.$^5$ ............................................. E02D 35/00
[52] U.S. Cl. .................................. 52/167 R; 248/560; 248/561; 248/566; 248/573; 248/581
[58] Field of Search ........ 52/167 R, 167 DF, 167 CB, 52/1; 248/560, 561, 581, 605, 614, 631

[56] References Cited

U.S. PATENT DOCUMENTS

| | | |
|---|---|---|
| 3,418,768 | 12/1968 | Cardan . |
| 3,538,653 | 11/1970 | Meckler . |
| 3,632,077 | 1/1972 | Hall et al. . |
| 3,796,017 | 3/1974 | Meckler . |
| 4,033,566 | 7/1977 | Petersen . |
| 5,005,326 | 4/1991 | Ishimaru et al. . |
| 5,035,394 | 7/1991 | Haak . |

Primary Examiner—David A. Scherbel
Assistant Examiner—Matthew E. Leno
Attorney, Agent, or Firm—Staas & Halsey

[57] ABSTRACT

A damping subsystem protects a structure from the effects of seismic disturbances and employs at least a first pair of first and second damping and transformation mechanisms including respective, associated first dampers oriented in parallel relationship in a first direction and oppositely disposed relatively to the center of gravity of the structure and mechanically connected between respectively corresponding portions of the structure and the foundation in relatively inverse relationship. Each mechanism transforms a force transferred to the associated first damper from the foundation in the first direction and/or any lateral, relative displacement of the corresponding structure and foundation portion in the first direction to a corresponding force and/or displacement, respectively, in a second direction perpendicular to the first direction, each also performing the reverse transformation. A mechanical interconnection between the first and second damping and transformation mechanisms transfers any such transformed force and/or displacement of the second direction from one to the other of the pair of first and second damping and transformation mechanisms, thereby to impede rotation of the structure relatively to the foundation. The respective, associated first dampers of the pair of mechanisms provide individually controllable damping of lateral displacement between the corresponding structure and foundation portions in the first direction.

11 Claims, 4 Drawing Sheets

DAMPING SYSTEM FOR STRUCTURE STABILIZATION SYSTEM

BACKGROUND OF THE INVENTION

1. Field of the Invention

This invention relates to an improved system for protecting structures, e.g., buildings, from the effects of seismic disturbances. More particularly, the present invention relates to improvements in damping systems, employable independently and/or in combination as a damping subsystem with a base isolated structure stabilization system.

2. Description of the Related Art

As described in the present inventor's U.S. Pat. No. 4,860,507 (hereinafter the '507 patent), a structure stabilization system can include a base isolation system in combination with either or both of a releasable interlock subsystem and a damping subsystem. The disclosure of this '507 patent is expressly incorporated herein both by reference and as effectively directly incorporated herein in its entirety.

Generally, the described base isolation system employs vertical support columns suspended by flexible elements from corresponding bases and which provide "floating" support of a structure relative to its foundation, thereby minimizing horizontal movement transmission from the ground to the structure. The base isolation system prevents unpredicted stresses from developing in the support columns and possible tendencies of the structure to rotate relatively to the foundation while assuring that a predetermined natural period of oscillation is maintained in common for all such columns and elements, and yet affording the ability to adjust the actual length of the flexible elements so as to maintain a common elevation of the support columns, thereby compensating for variations in ground level support of the bases, unequal stretching of the flexible suspension elements, and the like.

More particularly, the floors of the structure are individually connected to and supported by the plurality of vertical support columns. The support columns are suspended at their respective, lower ends by corresponding bases fixed to the foundation (and thus immovable with respect to the foundation and the earth in which the foundation is formed). Each base includes a plurality of generally vertical support members, each of which can sustain its respective, proportionate share of the compressive force of the structure, including potential lateral or transverse forces which may act thereon as produced by a seismic disturbance and which typically are much smaller than the compressive force. The vertical support members are secured at their lower ends to a base ring and at their upper ends to a support ring, to form an integral, rigid and strong structure. The support column passes downwardly through the support ring and preferably includes an enlarged diameter base portion. Flexible suspension support elements, e.g., cables, extend at their upper ends through corresponding through-holes in the support ring and are secured thereto by adjustable support mechanisms. The cables are secured at their lower ends to a metal clamp which is secured about the base of the support column. The cables further are engaged, each at a position intermediate its length, by an adjustable gripper mechanism which is secured to the support column. This adjustable gripper mechanism maintains the identical "effective" free length of the cables, thereby maintaining common harmonic characteristics, while permitting adjustment of the actual suspension lengths of the cables. This base isolation system minimizes the transmission of horizontal movement from the ground (and thus through the foundation of the structure) to the structure, in the event of a seismic disturbance. Effectively, the base isolation system permits the structure to "float" with respect to its foundation.

The releasable interlock subsystem employs a single pin received in a plate integrally formed in the floor of the structure, which prevents translational movement of the structure relative to its foundation in response to forces of ordinary levels, such as produced by winds. An automatic release mechanism is responsive to forces above a predetermined threshold level, as produced by a seismic disturbance, for automatically withdrawing the pin and causing the structure to "float", as supported by the base isolation system, thereby minimizing the transmission of horizontal movement from the ground to the structure.

Finally, the damping subsystem described in the '507 patent employs hydraulically interconnected dampers, arranged as one or more pairs, the dampers of each pair being mechanically connected in respectively inverted relationship between, and on corresponding, opposed sides of, the structure and its foundation (or other support fixedly secured to the ground). From a functional or theoretical standpoint, it is sufficient that the dampers of a given pair be displaced by substantially equal (and preferably the maximum possible) distances and in opposite directions from the center of gravity of the building. Preferably and typically, the dampers of each such pair are connected, in the relatively inverted relationship and at centrally located locations, between respective opposing, parallel walls of the structure and the corresponding foundation walls. A single such pair of dampers, mechanically connected in inverted relationship between the structure and its foundation and hydraulically interconnected, suffices to impede relative horizontal rotation, i.e., angular displacement, between the structure and its foundation, and furthermore will damp linear displacement of the structure relative to the foundation in a direction parallel to the orientation of the dampers. As a practical matter and preferably, a second such pair of dampers, oriented in a perpendicular or orthogonal direction relatively to the first pair and connected to corresponding opposing foundation walls orthogonally related to the first set of opposing foundation walls, is employed to damp linear displacement of the structure in the corresponding, perpendicular or orthogonal direction.

More particularly, reference is made to FIG. 1 herein which shows one embodiment of the damping subsystem of the '507 patent and, more particularly, one of two orthogonally related damper pairs. A first damper 10 of the pair is mechanically connected between a bracket 12 integral with a foundation wall 14 and a bracket 16 attached to the building floor 18, whereas the second damper 20 of the pair is oriented in inverted relationship, relatively to the first damper 10, and mechanically connected between a bracket 22 secured to the floor 18 and a bracket 24 integral with the opposing foundation wall 14. The dampers 10 and 20 are so connected at positions generally centrally disposed along the respectively associated structure/foundation walls.

The dampers 10 and 20 have corresponding pistons 11 and 13, the respective piston heads 11a and 13a of which define corresponding subchambers 10a, 10b and 20a, 20b within the dampers 10 and 20 and are connected to respective piston rods 11b and 13b. The pistons 11 and 13 are movable in sealed relationship within the corresponding cylindrical interior sidewalls of the respective dampers 10, 20 against the pressure of hydraulic fluid contained therein, in response to the forces tending to produce relative linear movement between the structure and the foundation walls 14 and which forces are transmitted to the dampers 10, 20 through the respective brackets 12, 16, 22 and 24. The dampers 10 and 20 are also hydraulically interconnected through hydraulic lines 30 and 32. The line 30 connects through orifice 38 with chamber 10a of damper 10 and through orifice 40 with chamber 20a of damper 20. In like manner, line 32 connects through orifice 42 with chamber 10b of damper 10 and through orifice 44 with chamber 20b of damper 20. Valves 34, 35 may be employed in the hydraulic line 30, and like valves 36, 37 may be employed in line 32 to regulate damping by selectively restricting fluid flow in the respective hydraulic lines 30, 32 between the dampers 10, 20.

Operation of the dampers 10, 20, under the influence of a seismic disturbance, will now be described. More particularly, for a structure having a base isolation system which does not afford the characteristics of the improved base isolation system of the '507 patent, the horizontal projection of the structure's center of gravity commonly does not coincide with the centroid of the forces which oppose the horizontal displacement of the earth. As a result, forces acting on the structure as produced by a seismic disturbance may produce rotation of the structure relative to its foundation and which rotation, in turn, produces linear displacements between the structure and the foundation, which occur in opposite directions along the opposing foundation/structure walls on opposite sides of the axis of rotation. These displacements are proportional to the distances of the respective walls from the center of rotation of the structure, and add to the linear displacement produced by translation of the structure relative to its foundation along one of these opposed foundation/structure walls. The increased linear displacement is a matter of serious concern, since it increases the probability of physical impact between elements attached to the structure and interconnecting and supporting same with respect to its base or foundation. The damper subsystem, since employing hydraulically interconnected damper pairs having respective, inverted connections between the foundation and the structure, prevents such gyrations.

It may be assumed that pistons 11 and 13 are normally centrally located within their respective dampers 10 and 20 and thus define corresponding, identical subchambers 10a, 10b and 20a, 20b and wherein the displacements $h_1$ and $h_2$ (later discussed) are equal to each other. Due to a seismic disturbance and as specifically illustrated in FIG. 1, bracket 22 (attached to the structure) and bracket 24 (attached to foundation wall 14) have moved more closely together than the opposite brackets 12, 16. The resulting movement of the piston 13 increases the pressure within and expels fluid from chamber 20a, decreasing the distance $h_1$ from the end of the piston head 13a to the opposing wall of the damper 20. The hydraulic fluid, since essentially incompressible, travels through line 30 into the subchamber 10a of damper 10 and expands the volume of same, thereby driving piston 11 downwardly (i.e., in the orientation of FIG. 1) and correspondingly increasing the distance $h_2$ from the piston head 11a to the opposing wall of the damper 10 and relatively displacing bracket 16 (attached to the floor 18) from bracket 12 (attached to the foundation wall 14). At all times, therefore, the sum of the distances $h_1$ and $h_2$ is constant.

Correspondingly, a seismic disturbance causing a downward displacement of bracket 16 relative to bracket 12, as viewed in FIG. 1, produces increased pressure within subchamber 10b which is communicated through line 32 to subchamber 20b, which then interacts between the piston 13 fixed to the bracket 24 (and in turn to the foundation wall 14) and the housing of damper 20, tending to draw the damper 20 and its associated bracket 22 (attached to the floor 18 of the structure) downwardly as viewed in FIG. 1. Again, the sum of $h_1$ and $h_2$ remains constant.

In summary, the above-described damping subsystem of the '507 patent is intended to achieve two important functions:

(1) to impede rotation or gyration of the structure relative to its foundation, in both the engaged and released states of the releasable interlock system—i.e., to maintain $h_1 + h_2 = a$ constant; and (2) to reduce the acceleration response of the system and damp lateral displacement of the structure relative to its foundation, when released from the releasable interlock system and thus when floating on the base isolation system.

The first function is achieved particularly by the hydraulic interconnection of the dampers of each pair, along with the relatively inverted mechanical connections of the respective dampers of the pair between the structure and its foundation. The second function is performed by the controlled damping characteristics of the dampers. In many cases, this conventional damping system of the '507 patent is fully applicable and effective.

However, depending on the building's characteristics (e.g., size and weight) and on the expected earthquake activity, the friction developed in the hydraulic lines interconnecting the dampers of a pair may exceed the maximum friction required to obtain optimal damping. Further, while generally it may be assumed that the hydraulic fluid employed in the damping system of the '507 patent is incompressible or at least that, in many cases, compressibility is negligible, one has to consider the dimensional factors involved. Particularly, due to the length of the interconnecting hydraulic lines 30, 32 for very large structures, the compressibility of the hydraulic fluid, expansion of the conduits in response to internal pressure and friction effects may reduce the responsiveness and controllability of the damping function. The '507 patent describes various additional features which attempt to compensate for the compressibility effect; for example, aligned and interconnected cylinders 46, formed of aluminum or other light metal and which have far less compressibility than the fluid, may be placed in and occupy a substantial portion of the volume within the lines 30, 32. While effective in performance, the cylinders 46 add to the cost and complexity of the overall system.

Thus, there remains a need for an improved damping system of simplified structure and reduced cost and complexity. For example, such an improved damping system should minimize the number of fluid paths and the number of fluid path interconnections, both to avoid frictional problems as above-noted and as well to avoid or minimize the problem of leakage at interconnections between components of the hydraulic system; furthermore, it should optimize the effectiveness of the control valves thereby to provide more precise regulation of the extent of damping.

The improved damping system of the present invention overcomes the deficiencies and inadequacies of prior art such damping systems and affords the above-described, advantageous and desirable characteristics, either when used as a subsystem of an overall structure stabilization system and/or as an independent damping system for structural stabilization.

SUMMARY OF THE INVENTION

It is an object of the present invention to provide an improved damping system for protecting a structure from the effects of a seismic disturbance.

Another object of the present invention is to provide an improved damping system for preventing a structure from rotating with respect to its foundation as a result of a seismic disturbance.

An additional object of the present invention is to provide an improved damping system for minimizing inertia forces exerted upon the structure and dissipating the energy exerted upon the structure by a seismic disturbance.

It is another object of the present invention to provide an improved damping system employing hydraulic dampers but which minimizes and/or eliminates the problem of hydraulic fluid compressibility or leakage.

It is another object of the present invention to provide an improved damping system which is capable of selective and more reliable damping control than conventional damping systems.

To achieve the foregoing and other objects of the present invention, there is provided an improved damping system employing at least a first pair of first and second, damping and transformation mechanisms respectively associated with a corresponding, first set of opposing, normally parallel and aligned structure and foundation walls. It is to be understood that the invention is not restricted to structures and associated foundations having, e.g., two perpendicular sets of opposing, parallel and aligned structure and foundation walls which thus define common rectangular configurations in a cross-sectional plane perpendicular to a vertical axis of the building; such a building configuration is referred to merely for convenience. The underlying geometric requirement is the parallel and reversely oriented relationship of the first and second damping and transformation mechanisms of each pair (and preferably of the orthogonally-related first and second pairs thereof) and their symmetrical disposition, relatively to and on opposite sides of the center of gravity of the building and preferably at the greatest distance possible from the center of gravity. Thus, throughout the description and claims hereof, reference to the parallel and aligned, opposing sets of foundation and structure walls is to be understood to the specify the noted relationship of the dampers. It will be understood that appropriate interconnections of each damper between the associated portions of the foundation and structure, regardless of the geometric configuration of same, can be achieved through appropriate mechanical connections (e.g., appropriate brackets, etc.).

The first and second mechanisms of each such pair are mechanically interconnected to impede relative rotation between the structure and its associated foundation while permitting controllably damped, lateral displacement of the structure, relatively to and in a direction aligned with, the associated set of parallel foundation walls. Each of the first and second mechanisms further is individually operable and controllable as to the effective damping function thereof; the first and second mechanisms of a given pair, however, are adjusted to afford the same effective damping function.

Preferably, at least first and second orthogonal pairs, each of first and second such mechanisms, are employed thereby to provide damping of lateral displacement of the building structure relative to its foundation in the respective, orthogonal directions, in addition to impeding relative rotation and/or gyration of the structure relatively to the foundation.

While differing embodiments of the damping subsystem of the invention are disclosed herein, all thereof employ a damping and transformation mechanism which transforms a lateral force and/or a potential relative displacement, each in a direction parallel to associated set of foundation walls, to a corresponding force and/or displacement extending perpendicularly to the associated set of parallel foundation walls. Each such transformed potential force and/or relative displacement moreover is mechanically transferred from one to the other of the pair of associated first and second mechanisms, which responds by performing the reverse transformation. Further, each such mechanism individually provides hydraulic damping and, in a preferred embodiment, selectively controllable hydraulic damping, of the extent of lateral displacement of the structure relatively to its foundation.

In a first preferred embodiment of the invention, each of the first and second mechanisms comprises a hydraulic damper of a dual chamber "L-shaped" configuration and thus wherein the dual (i.e., first and second) chambers extend in relatively perpendicular directions. Each chamber accommodates a piston having a piston head moveable in sealed relationship within the interior of the chamber and thus defining first (adjacent) and second (remote) axially aligned subchambers, the piston head being connected to an associated (integral) piston rod which extends through the second (remote) subchamber to the exterior of the damper. The first (adjacent) subchambers are directly hydraulically interconnected and, in effect, constitute a common "L-shaped" subchamber. Further, the respective, second (remote) subchambers are interconnected by a conduit which preferably includes an adjustable valve interposed in the conduit which selectively regulates the flow of hydraulic fluid therethrough and thus provides selective control of the extent of damping provided by the individual such dual chamber damper.

The dual chamber dampers of an associated pair are mounted, as disclosed in the '507 patent, at generally centrally located portions of respective ones of a pair, or set, of parallel, opposing foundation walls, each interconnecting the associated foundation wall and the structure. The associated dual chamber dampers of the pair are mounted in relatively inverse relationship, each with a first (parallel) chamber of the dual chambers thereof oriented in parallel with the associated foundation wall and preferably with the damper housing attached to the structure and, further, with the second (perpendicular) chamber of the dual chambers extending perpendicularly relatively to the associated foundation wall. The pair of dampers preferably is positioned such that the respective (perpendicular) pistons and the corresponding piston rods thereof, are axially aligned, simplifying the installation of a mechanical interconnection of the respective (perpendicular) pistons of the dual chamber dampers of an associated pair.

Each dual chamber "L-shaped" damper functions to transform a force or displacement having a direction parallel to the associated foundation wall to a corresponding force or displacement perpendicular thereto and to perform the reverse transformation, as well—i.e., to transform a perpendicular such force or displacement to a corresponding force or displacement parallel to the associated foundation wall. The parallel-to-perpendicular transformations (i.e., including the reverse thereof), as performed hydraulically within each dual chamber damper, thus provide for a convenient mechanical interconnection of the associated dampers of a pair—eliminating the hydraulic interconnections therebetween as employed in the disclosed structure of the '507 patent and, as well, the potential problems presented thereby—while performing the requisite function of impeding rotation or gyration of the structure relative to its foundation, i.e., maintaining $h_1 + h_2 =$ constant. The individual dual chamber dampers furthermore function individually and selectively, by adjustment of the associated valve of the interconnecting conduit, to provide a desired level of damping of lateral movement of the structure relatively to the foundation.

In a second preferred embodiment of the invention, each of the first and second mechanisms comprises an independent damper, interconnected between an associated foundation wall and the structure, the respective dampers of the associated first and second mechanisms of a pair being mounted in the noted, relatively inverse relationship and in parallel to the respective, opposing parallel foundation walls. Each such mechanism further includes a mechanical linkage which transforms forces and/or displacement in a direction parallel to the associated foundation wall to a corresponding force and/or displacement in a direction perpendicular thereto, i.e., the above-cited parallel-to-perpendicular and reverse transformations. The respective mechanical linkages of the associated first and second mechanisms of a pair thereof are mechanically interconnected and thus, as in the case of the first embodiment, perform the function of impeding rotation or gyration of the structure relative to the foundation and thus maintaining $h_1 + h_2 =$ constant.

In accordance with both of the basic embodiments of the present invention, first and second orthogonally-related pairs of first and second damping and transformation mechanisms are employed to afford damping of linear displacement in the respective, orthogonal directions, while also impeding rotation of the structure relative to the foundation.

The damping system of the present invention, in comparison with the conventional damping system of the '507 patent described above, better achieves the first purpose cited above, i.e., impeding the relative rotation or gyration of the structure relatively to the foundation, by providing a mechanical interconnection of the first and second mechanisms and which thereby avoids potential limitations or problems associated with the hydraulic interconnection of the dampers of an associated pair as provided by the structure of the '507 patent. Further, each of the associated damping mechanisms, since individually controllable with respect to the level of damping and as well since not subject to the noted limitations of the lengthy hydraulic interconnections of the '507 patent, affords more direct and precise control of the extent of damping, relative to the parameters of a given structure and the expected level of seismic activity.

The foregoing and other objects and advantages of the present invention will become clearer with reference to the accompanying drawings wherein like numerals refer to like parts throughout.

DESCRIPTION OF THE PREFERRED EMBODIMENTS

Figure 1:
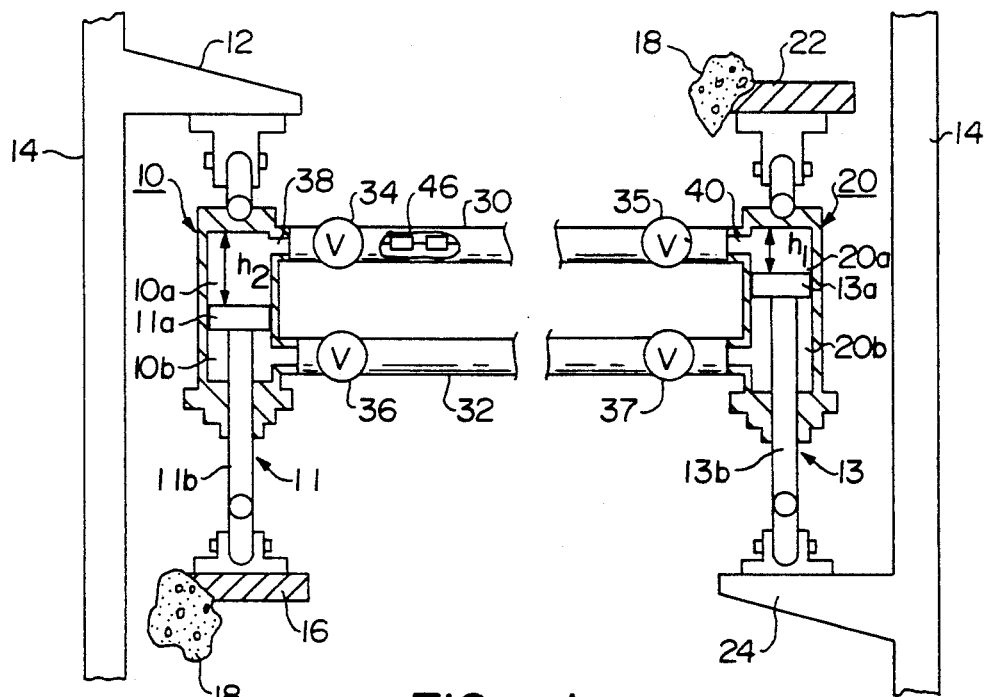
FIG. 1 is a fragmentary view, partially in cross section, of a pair of hydraulically interconnected dampers of the damping system of the herein incorporated '507 patent.

The damping system 50 of the present invention comprises at least first and second damping and transformation mechanisms 60 and 80, related as a pair, and respectively connected in relatively inverse, or oppositely oriented, relationship between the structure (represented by floor segments 90a and 90b) and corresponding, central portions of opposing, parallel foundation walls (represented by wall segments 96a and 96b, respectively). More particularly, the mechanisms 60 and 80 comprise "L-shaped" dual hydraulic dampers having respective housings 61 and 81, connected through brackets 90a and 90b to the floor segments 92a and 92b, respectively, and through respective pistons as later described, to integral brackets 94a and 94b of the foundation walls 96a and 96b, respectively. Inasmuch as the mechanisms 60 and 80 are identical in configuration and operation, a detailed description is provided primarily for the mechanism 60.

The housing 61 (81) of the mechanism 60 (80) defines a first chamber 62 (82) parallel to the foundation wall 92a (92b) and a second chamber 64 (84) oriented perpendicularly to the first chamber 62 (82) and wall 92a (92b), and axially aligned with the (perpendicular) second chamber 84 of the second mechanism 80 of the pair. A piston 70 includes a head 72 movable in sealed relationship with the corresponding cylindrical interior sidewall of the parallel chamber 62 and defines therewithin a first (adjacent) subchamber 62a and a second (remote) subchamber 62b. The second (perpendicular)

chamber 64 likewise receives a piston 74 having a head 76 received in sealed, sliding engagement therewithin and defining a first (adjacent) subchamber 64a and a second (remote) subchamber 64b. The housing 61, in the embodiment of FIG. 2, effectively defines a continuous or integral interconnection of the adjacent subchamber 62a and 64a, constituting effectively a single, or common, L-shaped such "adjacent" chamber. The remote subchambers 62b and 64b are interconnected by a conduit 66 including a valve 68 therein which is selectively adjustable to regulate the flow of hydraulic fluid therethrough and thus between the remote subchambers 62b and 64b.

The piston 70 includes a piston rod 73 which is mechanically connected to the bracket 94a, preferably through differential joints 73a and 73b and link 73c, to permit for a limited degree of misalignment while maintaining the intended transfer of forces and/or relative displacements parallel to foundation wall 96a and thus in axial alignment with piston rod 73. Piston 74 likewise includes a piston rod 77 connected to the head 76 and extending coaxially through the subchamber 64b, and thus perpendicularly to the wall 96a, and externally of the chamber 64. A conduit 66 (86) having a selectively controllable valve 68 (88) therein interconnects the remote subchambers 62b and 64b.

The other, identical transformation mechanism 80 similarly includes a perpendicularly oriented piston rod 87 and a parallel oriented piston rod 83, the latter extending parallel to the wall 96b and connected through link 83c by differential couplings 83a and 83b to the integral bracket 94b of the wall 96b. Further, a shaft 98 is connected, preferably by differential couplings 99a and 99b, to the piston rods 77 and 87, respectively, thereby to mechanically interconnect same.

Each of the mechanisms 60 and 80 functions to transform a force and/or a displacement in a direction parallel to the respectively associated foundation walls 92a and 92b (and thus to the axes of the respective parallel chambers 62 and 82), to a corresponding force and/or displacement perpendicular thereto and thus aligned with the axes of the respective second chambers 64 and 84. The thus transformed force and/or displacement is transferred from one to the other of the mechanisms 60 and 80 by the interconnecting shaft 98. This serves to impede rotation or gyration of the structure relatively to the foundation and specifically to maintain the sum of the distances $h_1 + h_2 =$ constant.

More particularly and with reference to the mechanism 60, a (parallel) force or displacement tending to cause lateral movement between the structure (floor segment 92a) and the associated foundation wall 96a will be transformed through the hydraulic interconnection of the adjacent subchambers 62a and 64a to a perpendicularly related, corresponding force or displacement. For example, a lateral force tending to move the structure downwardly in the plane of FIG. 2 such that floor segment 92a and bracket 90a tend to move closer to the foundation wall bracket 94a and/or an actual such relative lateral displacement, reducing the distance $h_1$ between the piston head 72 and the opposed wall of housing 61, is/are transformed into a corresponding force and/or displacement in the perpendicular direction, acting on or moving the piston rod 77 and correspondingly the shaft 98. This force and/or displacement thereby is transferred to the piston rod 87 and the associated mechanism 80 correspondingly responds thereto, performing the reverse transformation. As a result, the system 50 maintains $h_1 + h_2 =$ constant, thus preventing rotation or gyration of the structure relatively to the foundation.

The extent of damped, relative linear movement permitted by the mechanisms 60 and 80, on the other hand, is a function of the selectively controllable valves 68 and 88 and thus of the force imposed thereby, in opposing fluid flow through the respective conduits 66 and 86. Depending on the extent of damping thus afforded, the mechanisms 60 and 80 may cooperate to transfer essentially very little or no force through the connecting shaft 98 but to permit displacement of shaft 98 relatively to the mechanisms 60 and 80 and thus corresponding displacements of the pistons interconnected thereby within the respective (perpendicular) chambers 64 and 84. Conversely, depending on the adjustments of the valves 68 and 88, the mechanisms 60 and 80 may cooperate to transfer a force therebetween, through the interconnecting shaft 98, without any significant displacement of the shaft 90 or the associated pistons. The level of damping is determined in accordance with known requirements relevant to the parameters of the structure to be protected and in accordance with the official Regulation Spectrum for the environment of a given building and other factors as more fully explained in the '507 patent; typically, the valves 68 and 88 are adjusted to a level which results in transfers of both a force and a displacement through the shaft 90 and thus from one to the other of the mechanisms 60 and 80.

Figure 3:
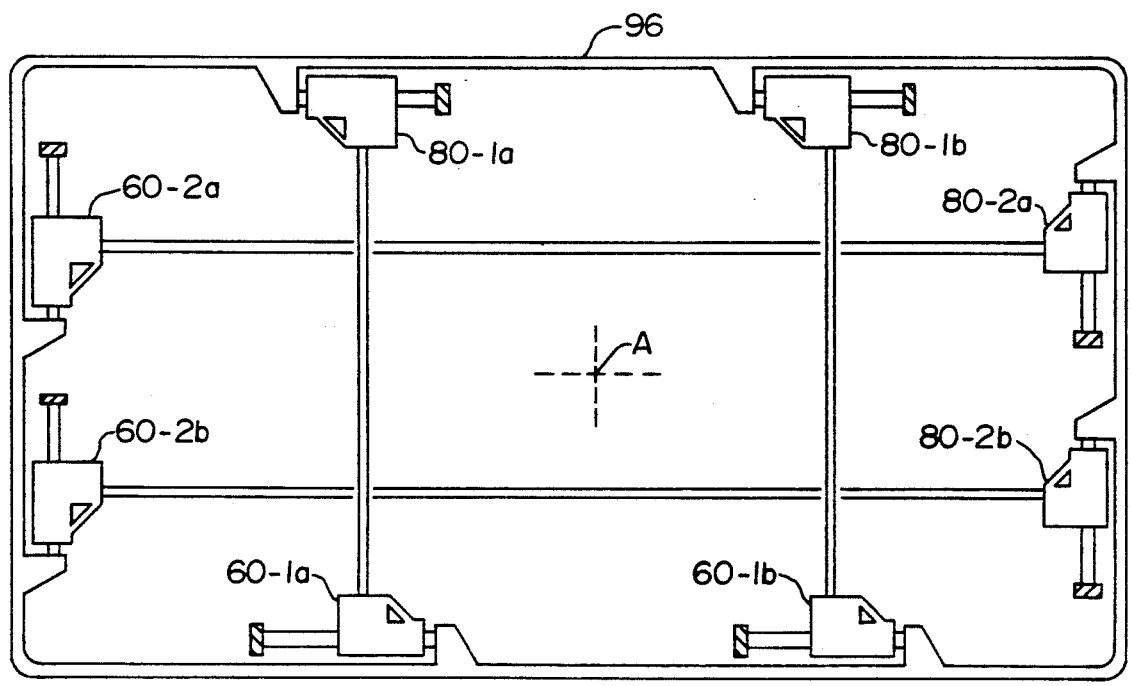
FIG. 3 is a schematic, plan view, partially in cross-section, illustrating a plurality of orthogonally related pairs of first and second damping and transformation mechanisms as may be employed in a practical installation in a large structure in accordance with the present invention.

FIG. 3 schematically illustrates not only the more typical and practical use of first and second, orthogonally related pairs of first and second damping and transformation mechanisms but also the provision of plural such pairs in each of the orthogonal directions. Thus, mechanisms 60-1a and 80-1a constitute a first such pair, orthogonally related to a second such pair 60-2a and 80-2a, each of which may be visualized as centrally located relatively to the respectively associated opposing foundation walls 96. FIG. 3 as actually presented, however, illustrates the further provision of plural such orthogonally related pairs and particularly of a second pair of first and second mechanisms 60-1b and 80-1b provided in orthogonal relationship with a further second such pair 60-2b and 80-2b, with all 35 of such mechanisms disposed in generally symmetrical positions relatively to the associated walls. The intersecting, orthogonal center lines in FIG. 3 having the point of intersection labelled A illustrate an axis passing through the center of gravity of the structure and perpendicular to the plane of the paper of FIG. 3. As will be recognized, the center of gravity of the structure is not necessarily the geometric center of the structure, nor is the orientation of the illustrated axis limiting. As taught in the '507 patent, for example at column 13, lines 55-65, the invention may be employed to prevent rotation of a structure relative to its foundation in a vertical plane.

Figure 2:
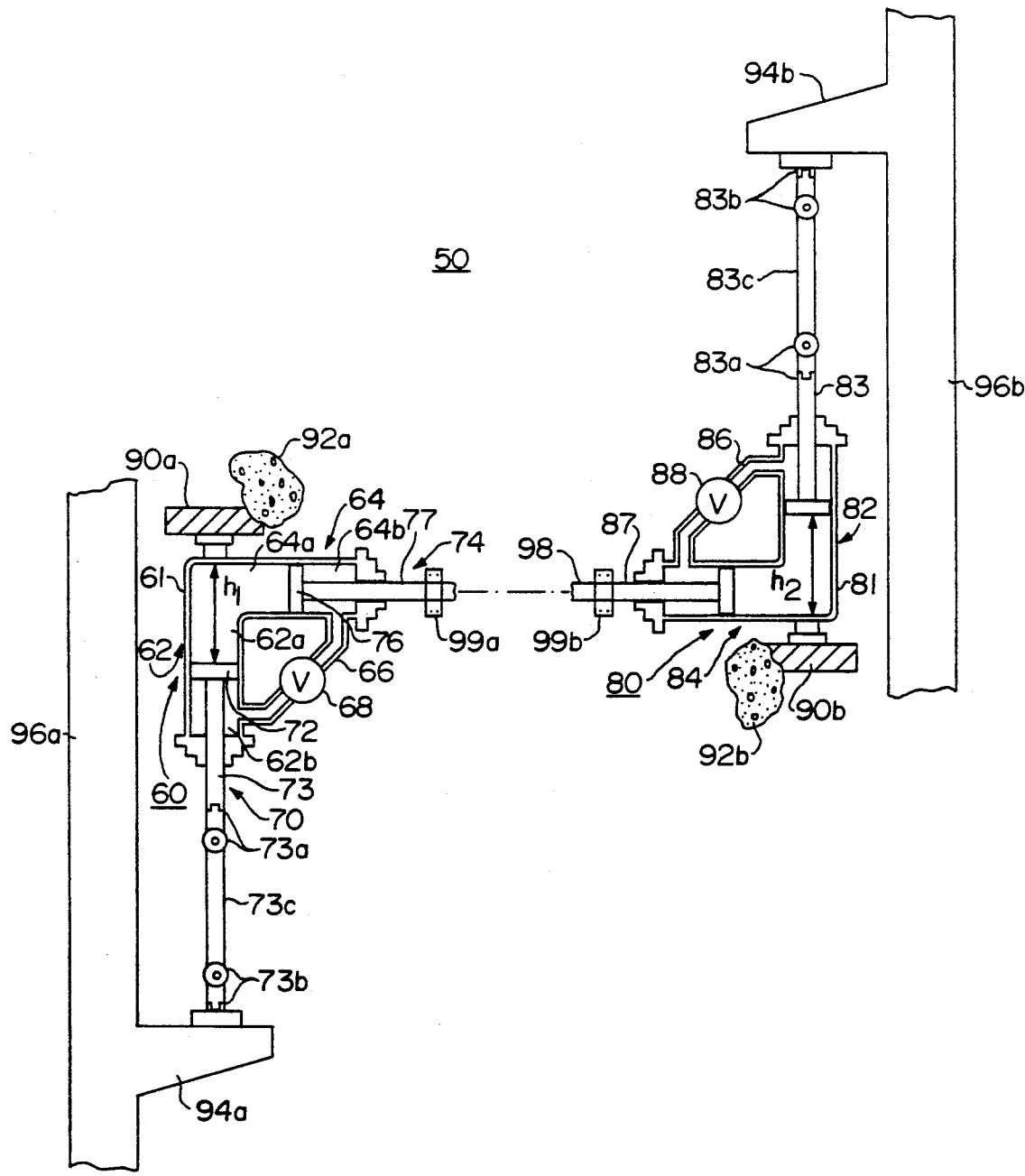
FIG. 2 is a fragmentary view, partially in cross-section, of a pair of damping and transformation mechanisms and their respective interconnections between a structure and its foundation and of the mechanical interconnection therebetween, according to a first embodiment of the present invention.
Figure 4:
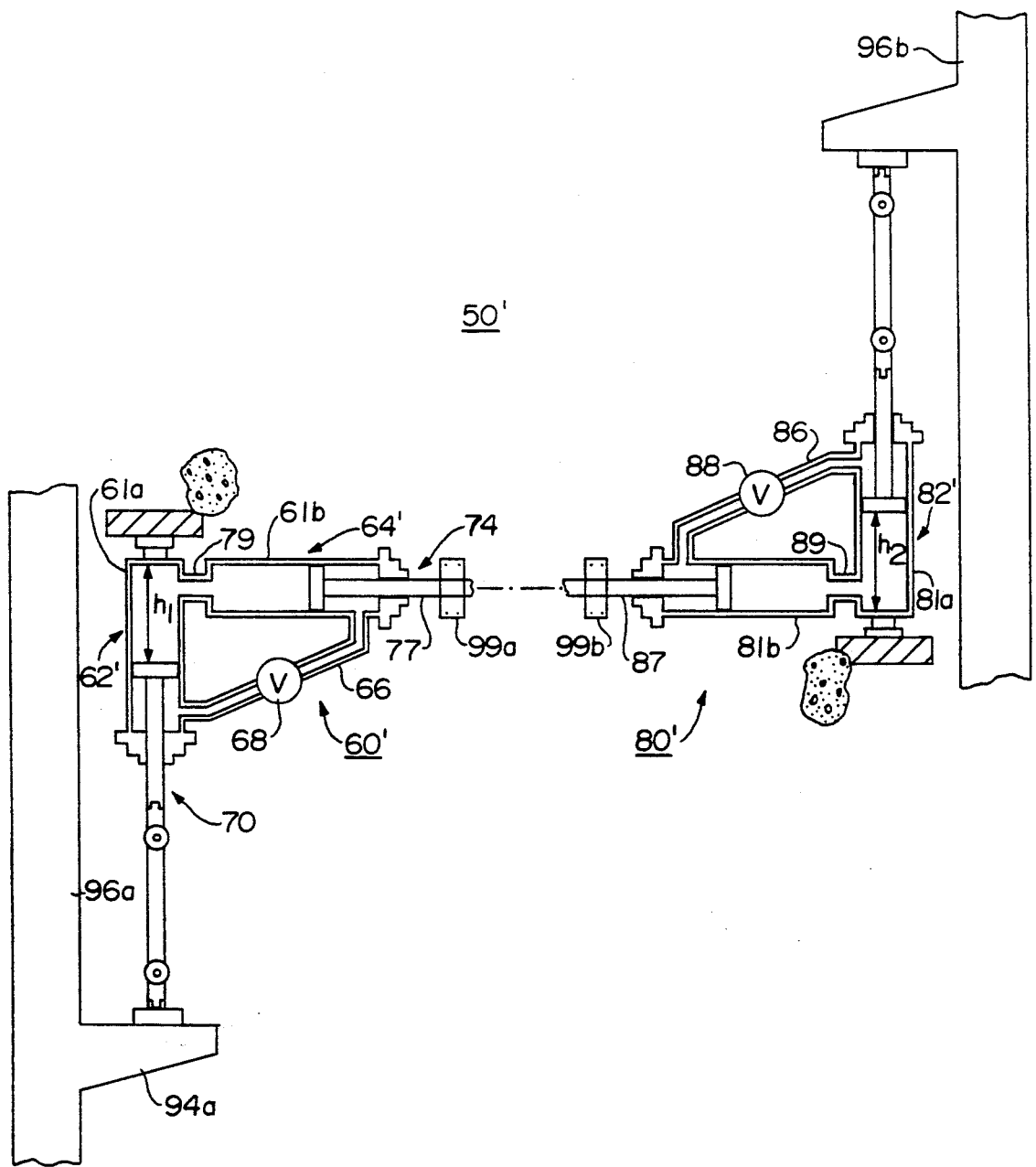
FIG. 4 is a fragmentary view, partially in cross-section, of a pair of damping and transformation mechanisms, individually comprising a variation of the damping and transformation mechanism of FIG. 2, and thus in accordance with the first embodiment of the present invention.

FIG. 4 illustrates a system 50' employing an alternative form of the mechanisms 60 and 80 of FIG. 2 and shown in FIG. 4 respectively at 60' and 80'. Therein, separate housings 61a and 61b define the corresponding chambers 62' and 64' of separate, or individual dampers having respective, adjacent chambers 62a' and 64a' which now are interconnected by a conduit 79. All other aspects of the system 50' of FIG. 4 are identical to those of the system 50 of FIG. 2. The embodiment of FIG. 4 thus illustrates the utilization of a pair of conventional dampers, or shock absorbers, having the specialized interconnection as above-described between the respective, adjacent and remote subchambers thereof.

Figure 5:
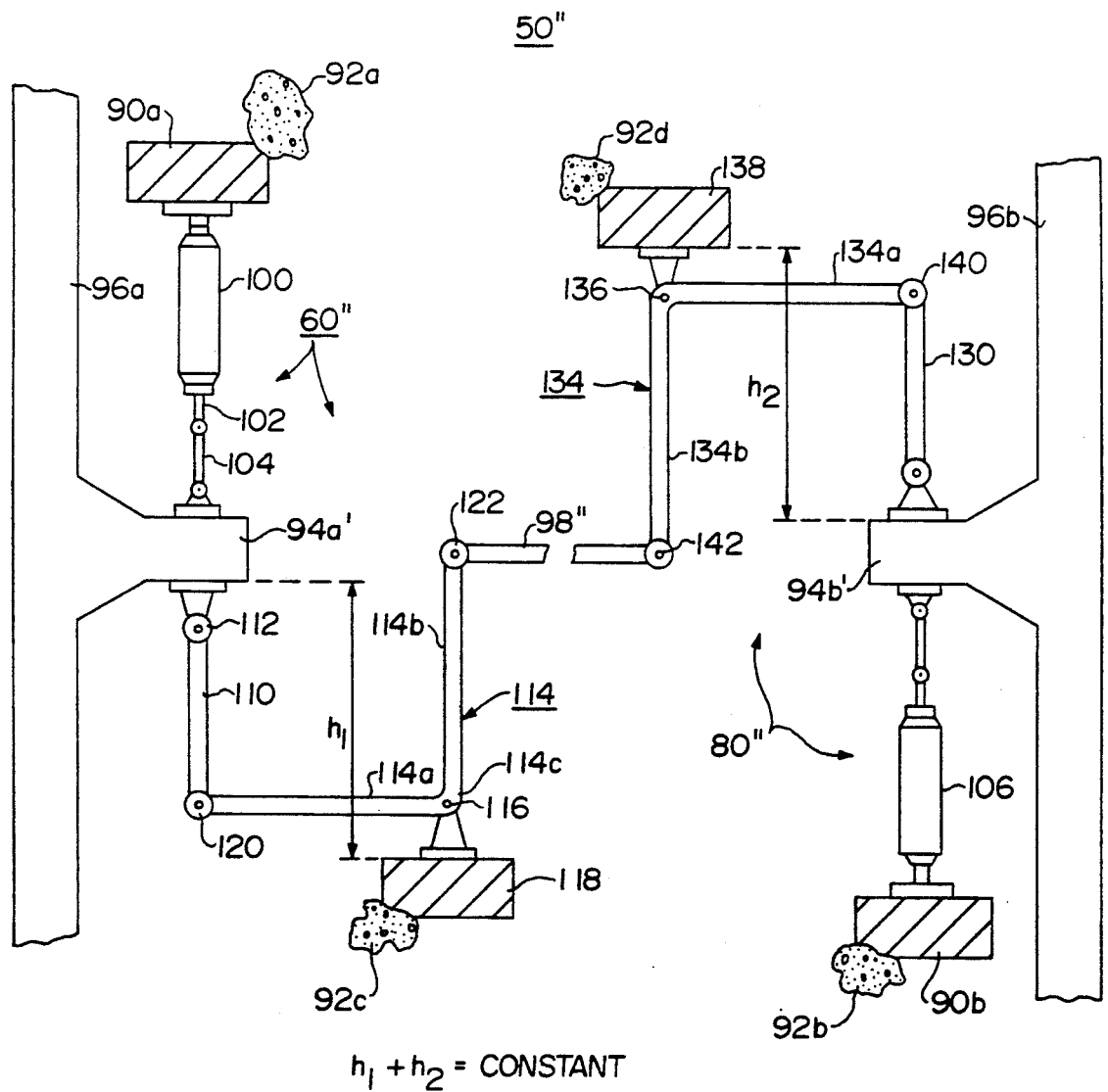
FIG. 5 is a fragmentary view, partially in cross-section, of a pair of damping and transformation mechanisms according to a second embodiment of the present invention and employable in the illustrative arrangement of orthogonally related pairs as shown in FIG. 3.

FIG. 5 is a schematic and partially cross-sectional view of a damping system 50" in accordance with a second embodiment of the invention and wherein parts which are otherwise identical are identified by identical but double-primed numerals. The system 50" again employs first and second damping and transformation mechanisms 60" and 80", each of which serves to transform a force and/or displacement parallel to an associated foundation wall to a corresponding force and/or displacement perpendicular thereto (and the reverse transformation) to achieve the function of impeding relative rotation or gyration of the structure relatively to its foundation and further to permit only damped relative linear movement therebetween, but wherein these functions are afforded by separate but structurally interrelated components. Since, again, the mechanisms 60" and 80" are identical, a detailed description is provided only for the mechanism 60".

The mechanism 60" includes a hydraulic damper 100, the housing of which is connected to bracket 90a secured to floor 92a and having a piston rod 102 connected through a link 104 (preferably having differential couplers, as before) to the integral foundation wall bracket 94a'. The hydraulic damper, or piston, 106 of the mechanism 80" is similarly connected but in inverse relationship.

A link 110 is connected at a first end by differential coupler 112 to the bracket 94a' and extends in parallel axial alignment with the piston rod 104 and, preferably, is axially aligned therewith. A force and displacement transformation member 114 is illustrated as a bracket of generally "L-shaped" configuration comprising two right-angle related arms 114a and 114b pivotally connected at the common apex 114c thereof (i.e., the common juncture of the arms 114a and 114b) by pivotal mount 116 to a bracket 118 connected in turn to a floor segment 92c. It will be understood that the member 114 may be a solid reinforced plate and thus need not comprise interconnected arm-like elements 114a and 114b; instead, the primary requirement of the member 114 is to have a central pivot position 116 and two lever arms extending therefrom substantially at right angles. Pivotal connection 120 interconnects the free end of arm 114a to the link 110 and pivotal connection 122 connects the free end of arm 114b to an interconnecting rod 98". The mechanism 80" similarly has a force and displacement transformation member 134 which is pivotally connected to pivotal mount 138 in turn connected to floor segment 92d; the free end of arm 134a is connected by pivotal coupler 140 to link 130 and the free end of arm 134b is connected by pivotal coupler 142 to the corresponding end of the shaft 98".

The force and displacement transformation members 114 and 134 of the respective mechanisms 60" and 80" serve to perform the reverse transformations of forces and/or displacements between the parallel and perpendicular directions relatively to the associated walls 96a and 96b, as before-described, thereby to impede relative gyrations or rotations between the structure and the foundation and thus to maintain $h_1 + h_2 =$ constant. In this embodiment, $h_1$ and $h_2$ represent respective distances between any two commonly-defined and fixed points respectively on the structure and the foundation at positions oppositely disposed relatively to the axis defining the center of gravity of the structure and parallel to the respective walls 96a and 96b. For convenience, those distances are defined between the confronting faces of the integral bracket 94a' of the wall 96a and the bracket 118 as to $h_1$ and between the confronting faces of the integral bracket 94b' of wall 96b and bracket 138 as to $h_2$. Again, by appropriately selecting the damping action of the dampers 100 and 106, either force and no displacement, displacement and no force, or a combination of force and displacement may be transferred between the mechanisms 60' and 80'.

It will be understood that in practical installations, the structural components of the mechanisms and their interconnections may be conveniently suspended from the floor of the structure. For example, in FIG. 2, suitable support brackets may couple the rods 73c and 83c and as well the shaft 98 to the superposed floor of the structure but so as to permit sliding movement thereof relatively to the floor. Conversely, by reversing the interconnections of the mechanisms 60 and 80 to the structure and the foundation (e.g., by connecting housing 61 to bracket 94a and connecting piston rod 70 through link 73 to the bracket 90a in turn connected to floor 92a), these mechanical elements (i.e., rod 73 and shaft 98) may remain fixed relatively to the foundation and thus may be suitably supported on the foundation. Similar observations are applicable to the embodiment of FIG. 5. Therein, it will be understood that links 110 and 130 and shaft 98' undergo principally rectilinear movement, respectively parallel to and perpendicularly to the associated pair of sidewalls 96a and 96b, whereas the bracket members 114 and 134 are intended to pivot and thus move through a short arcuate distance relatively to the floor of the structure while the pivot points 116 and 136, on the other hand, move with the structure and thus in a substantially linear direction parallel to the direction of the walls 96a and 96b.

The embodiments of FIGS. 2 through 5 are also susceptible to an alternative interpretation wherein the damping systems 50, 50' and 50" of the invention may be employed for preventing rotation of a structure in a vertical plane relative to its associated foundation while permitting only vertical, linear displacement therebetween. In this regard, e.g., FIG. 2 may be envisioned as an elevational view wherein the walls 96a and 96b and brackets 94a and 94b are in cross-section, and further wherein the brackets 90a, 90b represent vertical cross-sections of brackets secured to a structure, the structure then being supported vertically above the elevation of bracket 94b of the right (i.e., as seen in FIG. 2) wall 96b.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

I claim:

1. A damping system for protecting a structure from the effects of seismic disturbances, the structure being supported by a base isolation system which is anchored to a foundation associated with the structure and which affords limited, relative movement between the structure and the foundation thereby to limit the transmission to the structure of movement of the earth and foundation resultant from a seismic disturbance, comprising:

a pair of first and second, damping and transformation mechanisms each including an associated, first damper, the respective, associated first dampers of the first and second damping and transformation mechanisms being oriented in parallel relationship in a first direction and oppositely disposed relatively to a first axis extending through the center of gravity of the structure and being mechanically connected between respectively corresponding portions of the structure and the foundation in a relatively inverse relationship;

each of said first and second, damping and transformation mechanisms transforming each of a force transferred thereto in the first direction from the foundation and any lateral, relative displacement of the corresponding structure and foundation portions in the first direction to a corresponding force and a corresponding displacement, respectively, in a second direction perpendicular to the first direction and, in reverse, transforming any force and any lateral displacement applied thereto in the second, perpendicular direction to a corresponding force and lateral displacement, respectively, in the first, parallel direction;

means, mechanically interconnecting said pair of first and second damping and transformation mechanisms, for transferring from one to the other thereof any such transformed, perpendicular force and displacement, thereby to impede rotation of the structure relatively to the foundation; and each said first damper individually permitting only selectively damped, relative, lateral displacement between the respectively corresponding structure and foundation portions.

2. A damping system as recited in claim 1, wherein each of said first and second, damping and transformation mechanisms further comprises:

means for selectively and individually controlling the extent of damping of said associated, first damper.

3. A damping system as recited in claim 1, wherein each of said first and second damping and transformation mechanisms further comprises:

an associated, second damper oriented in a second direction perpendicular to said first direction of orientation of first associated damper;

each of said associated first and second dampers defining an interior chamber receiving a hydraulic fluid therein and having a piston head received in sealed, sliding relationship therein, each piston head defining adjacent and remote subchambers of the chamber and having a piston rod extending therefrom, coaxially through the remote subchamber and exteriorly of the damper; and means for hydraulically interconnecting the respective adjacent subchambers of the first and second dampers and thereby effecting said force and displacement transformations.

4. A damping system as recited in claim 3, wherein said mechanically interconnecting means comprises:

a shaft interconnecting the respective piston rods of the second dampers of the respectively associated first and second, damping and transformation mechanisms.

5. A damping system as recited in claim 3, further comprising, for each of said first and second, damping and transformation mechanisms:

a conduit interconnecting the respective remote subchambers of the first and second, associated dampers; and a valve interspersed in the conduit and selectively adjustable to control the flow of hydraulic fluid therethrough and thereby the level of the force, in the first direction aligned with the first damper, transferred from the foundation to the structure and correspondingly the extent of relative lateral movement of the associated structure and foundation portions.

6. A damping system as recited in claim 3, wherein the respective, adjacent subchambers of the first and second associated dampers are integrally and continuously interconnected in perpendicular relationship as a single remote subchamber common to both said first and second associated dampers.

7. A damping system as recited in claim 6, wherein each of said associated, first and second dampers further comprises:

a common housing having an L-shaped configuration and defining corresponding, first and second perpendicularly related housing portions respectively defining the first and second chambers and integrally and continuously interconnecting the respective adjacent subchambers thereof in the perpendicular relationship as said single remote subchamber common to both said first and second associated dampers.

8. A damping system as recited in claim 3, wherein: said associated first and second dampers further comprise respective, first and second housings defining the respective interior chambers thereof; and said hydraulic interconnecting means further comprises a conduit interconnecting the respective, adjacent subchambers of the first and second dampers.

9. A damping system as recited in claim 1, further comprising:

at least first and second orthogonally oriented pairs of first and second damping and transformation mechanisms connected between the structure and the foundation at respective, orthogonally related positions oppositely disposed relative to the center of gravity of the structure.

10. The damping system as recited in claim 1, wherein:

each associated damper further comprises a housing defining an interior chamber receiving a hydraulic fluid therein and having a piston head received in sealed, sliding relationship therein and having a piston rod extending therefrom in the first direction, the housing being connected to the associated foundation and the piston rod being connected to the structure.

11. A damping system as recited in claim 1, wherein: each of said pair of first and second damping and transformation mechanisms further comprises a mechanical linkage defining first and second arms extending from a common apex at substantially right angles in a plane transverse to the first axis and each arm having a free end, the linkage being pivotally mounted at the common apex in fixed relationship relatively to one of the structure and the foundation, for rotation about a second axis parallel to the first axis, the first arm extending substantially perpendicularly to and being pivotally connected to the piston rod of the first, associated damper; and said mechanical interconnecting means interconnects the free ends of the respective second arms of the mechanical linkages of the pair of first and second damping and transformation mechanisms.

* * * * *

UNITED STATES PATENT AND TRADEMARK OFFICE
CERTIFICATE OF CORRECTION

PATENT NO.  : 5,152,110
DATED       : Oct. 6, 1992
INVENTOR(S) : GARZA-TAMEZ

It is certified that error appears in the above-indentified patent and that said Letters Patent is hereby corrected as shown below:

TITLE PAGE: [56] References Cited, please add the following:

U.S. PATENT DOCUMENTS

| Patent No. | Date | Inventor | Class |
|---|---|---|---|
| 1,761,321 | 06/1930 | Wells | |
| 1,761,322 | 06/1930 | Wells | |
| 3,110,464 | 11/1963 | Baratoff et al. | 248/20 |
| 3,129,531 | 04/1964 | Connor | 50/52 |
| 3,638,377 | 02/1972 | Caspe | 52/167 |
| 3,726,986 | 04/1973 | Higaki et al. | 174/43 |
| 3,731,898 | 05/1973 | Smith | 248/328 |
| 3,789,174 | 01/1974 | Barkan et al. | 200/168 |
| 3,977,140 | 08/1976 | Matsudaira et al. | 52/167 |
| 3,986,367 | 10/1976 | Kalpins | 61/100 |
| 4,042,651 | 08/1977 | Gaurois | 261/111 |
| 4,166,344 | 09/1979 | Ikonomou | 52/167 |
| 4,266,379 | 05/1981 | Valencia Aguilar | 52/167 |
| 4,371,143 | 02/1983 | Ishida et al. | 248/638 |
| 4,389,141 | 06/1983 | Cumings | 405/211 |
| 4,496,130 | 01/1985 | Toyama | 248/585 |
| 4,554,767 | 11/1985 | Ikonomou | 52/167 |
| 4,574,540 | 03/1986 | Shiau | 52/167 |
| 4,587,773 | 05/1986 | Valencia | 52/167 DF |
| 4,700,932 | 10/1987 | Katsuno | 267/136 |
| 4,860,507 | 08/1989 | Garza-Tamez | 52/167 |

UNITED STATES PATENT AND TRADEMARK OFFICE
CERTIFICATE OF CORRECTION

PATENT NO. : 5,152,110
DATED : Oct. 6, 1992
INVENTOR(S) : GARZA-TAMEZ

It is certified that error appears in the above-indentified patent and that said Letters Patent is hereby corrected as shown below:

TITLE PAGE: [56] References Cited, please add the following:

FOREIGN PATENT DOCUMENTS

| | | |
|---|---|---|
| 872117 | 06/1971 | Canada |
| 915353 | 11/1972 | Canada |
| 376615 | 05/1973 | U.S.S.R. |

Signed and Sealed this

Twenty-fourth Day of September, 1996

Attest:

BRUCE LEHMAN

*Attesting Officer*   *Commissioner of Patents and Trademarks*